(12) United States Patent
Nishimori et al.

(10) Patent No.: US 8,799,781 B2
(45) Date of Patent: Aug. 5, 2014

(54) INFORMATION PROCESSING APPARATUS REPRODUCING MOVING IMAGE AND DISPLAYING THUMBNAILS, AND INFORMATION PROCESSING METHOD THEREOF

(75) Inventors: Yuichi Nishimori, Tokyo (JP); Michihiro Okada, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 807 days.

(21) Appl. No.: 12/574,088

(22) Filed: Oct. 6, 2009

(65) Prior Publication Data

US 2010/0088646 A1 Apr. 8, 2010

(30) Foreign Application Priority Data

Oct. 7, 2008 (JP) .................................. 2008-261143

(51) Int. Cl.
*G06F 3/00* (2006.01)
*G06F 3/048* (2013.01)
*H04N 5/445* (2011.01)
*G11B 27/34* (2006.01)
*G06F 3/0481* (2013.01)

(52) U.S. Cl.
CPC ............ *H04N 5/44543* (2013.01); *G11B 27/34* (2013.01); *G06F 3/04817* (2013.01)
USPC ............................. 715/720; 715/719; 715/838

(58) Field of Classification Search
CPC .......... H04N 5/44543; H04N 7/17318; H04N 21/4622; G11B 27/34; G11B 27/034; G06F 3/0481; G06F 3/04812; G06F 3/04817; G06F 3/0482

USPC ........................... 715/716–726, 838; 386/124
See application file for complete search history.

(56) References Cited

U.S. PATENT DOCUMENTS

| 5,519,828 | A | * | 5/1996 | Rayner | 715/723 |
| 5,732,184 | A | * | 3/1998 | Chao et al. | 386/282 |
| 6,154,771 | A | * | 11/2000 | Rangan et al. | 709/217 |
| 6,774,917 | B1 | * | 8/2004 | Foote et al. | 715/700 |
| 6,819,344 | B2 | * | 11/2004 | Robbins | 715/848 |
| 6,912,327 | B1 | * | 6/2005 | Hori et al. | 382/305 |
| 7,149,974 | B2 | * | 12/2006 | Girgensohn et al. | 715/723 |
| 7,246,314 | B2 | * | 7/2007 | Foote et al. | 715/700 |
| 7,251,790 | B1 | * | 7/2007 | Drucker et al. | 715/838 |

(Continued)

FOREIGN PATENT DOCUMENTS

JP 2009-59312 3/2009
JP 2009-60539 3/2009

*Primary Examiner* — Tadeese Hailu
*Assistant Examiner* — James T Durkin
(74) *Attorney, Agent, or Firm* — Frommer Lawrence & Haug LLP; Paul A. Levy; William S. Frommer

(57) ABSTRACT

A thumbnail display screen is displayed. The thumbnail display screen contains a first thumbnail array and a second thumbnail array, in which the images of two groups of frames extracted from a moving image file according to different rules are aligned in the order of appearance in the moving image. The first thumbnail array can be shifted forward or backward via an input apparatus, and the second thumbnail array is shifted in conjunction with a shift of the first thumbnail array. When one of the frames on the thumbnail display screen is selected, the moving image is played from the selected frame or the nearest scene switching point from the frame.

13 Claims, 5 Drawing Sheets

(56) References Cited

U.S. PATENT DOCUMENTS

| | | | |
|---|---|---|---|
| 7,296,231 B2* | 11/2007 | Loui et al. | 715/723 |
| 7,313,808 B1* | 12/2007 | Gupta et al. | 725/89 |
| 7,596,755 B2* | 9/2009 | Graham | 715/723 |
| 7,606,444 B1* | 10/2009 | Erol et al. | 382/305 |
| 7,644,364 B2* | 1/2010 | Patten et al. | 715/726 |
| 7,725,828 B1* | 5/2010 | Johnson | 715/726 |
| 7,823,055 B2* | 10/2010 | Sull et al. | 715/201 |
| 8,095,892 B2* | 1/2012 | Anthony et al. | 715/851 |
| 8,126,312 B2* | 2/2012 | Bushell et al. | 386/278 |
| 8,209,612 B2* | 6/2012 | Johnson | 715/726 |
| 8,375,332 B2* | 2/2013 | Park et al. | 715/838 |
| 2001/0021268 A1* | 9/2001 | Jun et al. | 382/165 |
| 2004/0090462 A1* | 5/2004 | Graham | 345/767 |
| 2004/0095376 A1* | 5/2004 | Graham et al. | 345/716 |
| 2004/0233239 A1* | 11/2004 | Lahdesmaki | 345/810 |
| 2005/0160377 A1* | 7/2005 | Sciammarella et al. | 715/838 |
| 2007/0174791 A1* | 7/2007 | Park et al. | 715/838 |
| 2007/0266343 A1* | 11/2007 | Isoda | 715/838 |
| 2008/0152298 A1* | 6/2008 | Ubillos | 386/52 |
| 2009/0063981 A1* | 3/2009 | Kikuchi et al. | 715/723 |
| 2009/0153648 A1* | 6/2009 | Quennesson | 348/43 |
| 2009/0172545 A1* | 7/2009 | Yokoi | 715/721 |
| 2009/0288010 A1* | 11/2009 | Ubillos | 715/720 |

\* cited by examiner

INFORMATION PROCESSING APPARATUS REPRODUCING MOVING IMAGE AND DISPLAYING THUMBNAILS, AND INFORMATION PROCESSING METHOD THEREOF

BACKGROUND OF THE INVENTION

1. Field of the Invention

The present invention relates to an information processing technique, and particularly to an information processor that is provided with a moving image playing function and an information processing method applicable to the information processor.

2. Description of the Related Art

Due to the advancements in information processors and image compression techniques of recent years, a recorded television program, an image captured by a home video recorder, or various moving image contents obtained via a recording medium or a network can be played daily for pleasure using an individually-owned player. As various moving images become increasingly accessible and the sources thereof become multifarious, efficiency has been required for selecting a desired moving image.

Unlike still images, moving images are made up of data having temporal widths. Accordingly, in order to understand the whole picture, a user needs, after all, to play and view the entire moving image. Also, it is difficult to adopt a method of browsing through a number of files at once to select one file, which is applicable to a still image. As a technique for selecting a file without having a full view, there is a function to display one frame of a moving image as a thumbnail. However, with such function, there is considerable lack in the amount of information as compared with the original moving image data, and the content of the moving image is sometimes unable to be recognized merely by its thumbnail image.

Also, when only a fraction of a long moving image needs to be checked or when a moving image needs to be played from a given scene, the desired point to be played in the moving image is generally reached by searching for a desired scene while actually playing the moving image at a higher speed. Accordingly, there has been a problem with efficiency for such a method.

SUMMARY OF THE INVENTION

The present invention has been made in view of such problems, and a purpose thereof is to provide a technique for enabling a user to easily comprehend information regarding the content of a moving image and to access a desired scene accurately and efficiently.

One aspect of the present invention relates to an information processor. The information processor comprises: a frame extraction unit which extracts frame data from a moving image file in accordance with a plurality of predetermined rules; a decoding unit which decodes frame data extracted by the frame extraction unit; and a display unit which simultaneously displays a plurality of thumbnail arrays which correspond to the respective rules, wherein in each of the thumbnail arrays are aligned, in the order of appearance in the moving image, the images of frames decoded by the decoding unit with respect to the rule according to which the data of the frames have been extracted.

Another aspect of the present invention relates to an information processing method. The information processing method comprises: a processor's extracting frame data from a moving image file stored in a memory in accordance with a plurality of predetermined rules; a processor's decoding extracted frame data to generate image data and storing the data in a buffer; and a display apparatus's reading image data stored in a buffer and simultaneously displaying a plurality of thumbnail arrays which correspond to the respective rules, wherein in each of the thumbnail arrays are aligned, in the order of appearance in the moving image, the images of frames with respect to the rule according to which the data of the frames have been extracted.

The "frame data" means data or a data set necessary to decode each frame included in an original moving image file. Also, the "image data" means decoded data or a decoded data set necessary to display each frame on a display apparatus.

Optional combinations of the aforementioned constituting elements, and implementations of the invention in the form of methods, apparatuses, systems, computer programs, and recording media storing computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
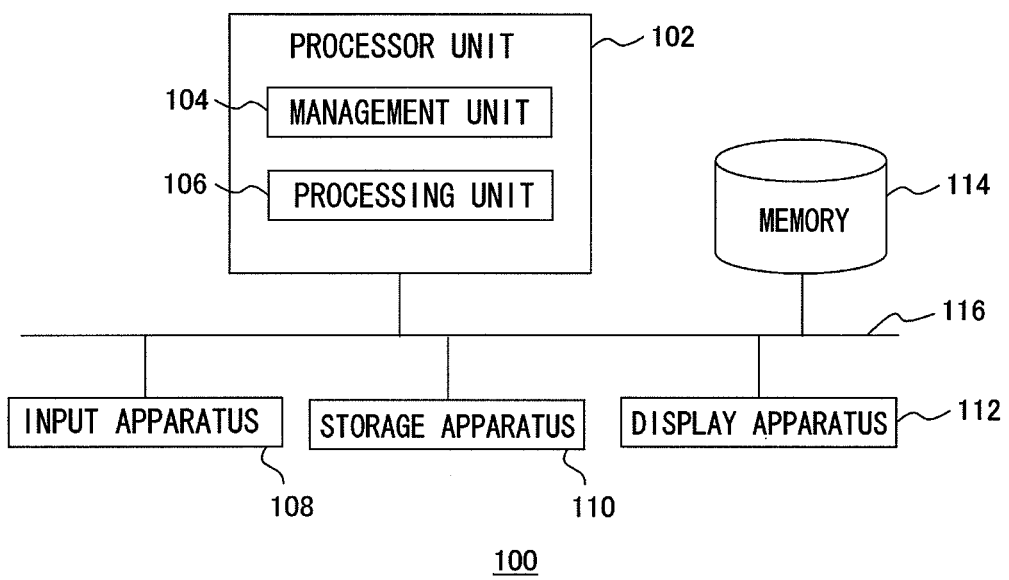
FIG. 1 is a diagram that shows a configuration of an information processor according to the present embodiment.

FIG. 1 shows a configuration of an information processor according to the present embodiment. An information processor 100 comprises: a processor unit 102 which provides overall control of the whole information processor and performs a decoding process on a moving image file and other processes; a memory 114 which stores a program being executed or data necessary to execute a program; an input apparatus 108 which accepts an input from a user; a storage apparatus 110 which stores a moving image file; and a display apparatus 112 which displays a thumbnail image or a moving image. The processor unit 102, memory 114, input apparatus 108, storage apparatus 110, and display apparatus 112 perform data transmission between one another via a bus 116.

The processor unit 102 includes a management unit 104 which controls overall processing in the information processor 100, and a processing unit 106 which performs processing under the control of the management unit 104. Other than controlling inputting or outputting of data between the processor unit 102 and the memory 114, input apparatus 108, storage apparatus 110, or display apparatus 112, the management unit 104 manages the schedule of processing in the processing unit 106 and provides control such that multiple processes or threads are switched to be processed therein. The processor unit 102 may be implemented by a common processor.

Under the control of the management unit 104, the processing unit 106 decodes a moving image file stored in the storage apparatus 110 to generate image data and outputs the data to the display apparatus 112. The moving image file may be encoded in any method, such as MPEG-4, H.264/AVC, and SVC (Scalable Video Coding). The processing unit 106 performs a decoding process using a common method according to the encoding method used for a moving image file to be processed, and generates image data to be displayed on the display apparatus 112.

Other than the function to play or to display, as one moving image, a moving image file selected by a user, the information processor 100 also provides a function to display a thumbnail array, in which multiple frames extracted from frames constituting a moving image according to a given rule are aligned in chronological order. Hereinafter, the former function is referred to as "normal play mode", and the latter is referred to as "thumbnail display mode." In the thumbnail display mode, the processing unit 106 also performs other processing, such as determining a scene to be displayed as a thumbnail and extracting a frame, in addition to the normal decoding process. When a user selects one of multiple frames constituting a thumbnail array displayed in the thumbnail display mode, the mode switches to the normal play mode, and the processing unit 106 starts playing the moving image from the selected frame or a frame in the vicinity thereof.

The input apparatus 108 may be a commonly-used input apparatus, such as a button, a keyboard, a mouse, a trackball, or a touch panel provided on the screen of the display apparatus 112, as long as the apparatus enables a user to provide an input for selecting a moving image file or an input for shifting a thumbnail array displayed on the display apparatus 112. The storage apparatus 110 may be a hard disk that records an encoded moving image file, or the combination of a recording medium such as a DVD (Digital Versatile Disk) and a CD (Compact Disk), and a reading device therefor.

Figure 2:
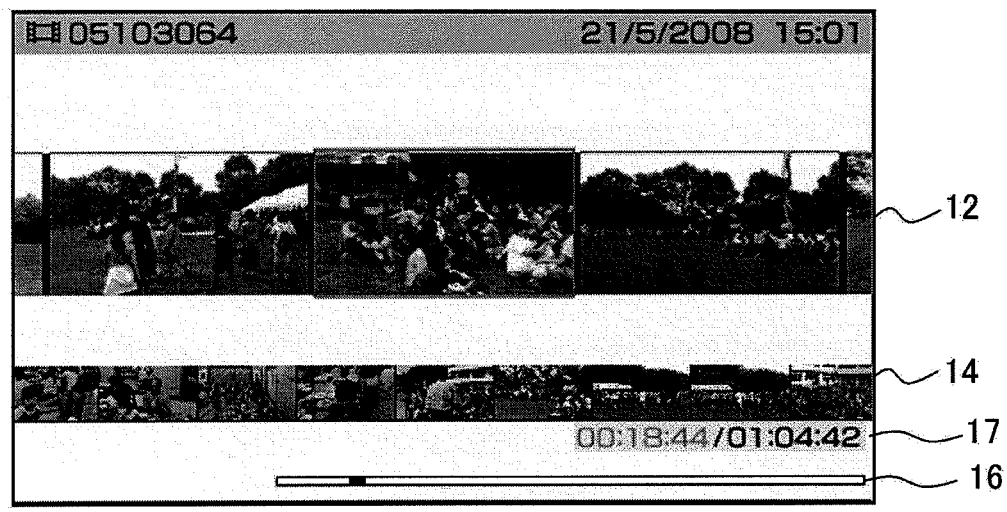
FIG. 2 is a diagram that shows an example of a screen displayed in a thumbnail display mode on a display apparatus in the present embodiment.

FIG. 2 shows an example of a screen displayed in the thumbnail display mode on the display apparatus 112. In the thumbnail display mode, as described above, part of frames constituting a moving image are extracted to be displayed as thumbnails. The extraction is performed according to a predetermined rule. For example, frames may be extracted at given time intervals on the time axis of a moving image, or, if breakpoint information, such as chapters and an index, is added to a moving image file, frames lying at such breakpoints may be extracted. The extracted frames are then aligned and displayed in the order of appearance in the moving image, so that moving image data having a temporal width can be recognized in a simple form. Thus, a user can comprehend the outline of a moving image in a short time before playing the whole image. Also, playing can be started from a desired scene, so that the efficiency can be improved especially when part of a moving image needs to be viewed.

In addition, multiple thumbnail arrays that each consist of frames extracted according to a different rule are displayed on a single screen in the present embodiment. On a thumbnail display screen 10 shown in FIG. 2, two thumbnail arrays, i.e., a first thumbnail array 12 and a second thumbnail array 14, are displayed, in which the horizontal direction represents an individual time axis. Both the thumbnail arrays consist of frames extracted from the same moving image file, but, for example, the first thumbnail array 12 consists of frames extracted at fifteen-second intervals on the time axis of the original moving image, and the second thumbnail array 14 consists of frames extracted at two-minute intervals.

As the first thumbnail array 12 or second thumbnail array 14 displayed on the thumbnail display screen 10, only the range of frames that fit within the width of the thumbnail display screen 10 are displayed among the frames at given time intervals in a moving image. The ranges to be displayed are determined so that both the thumbnail arrays include a common scene, that is, the same time on the time axis of the moving image. For instance, on the thumbnail display screen 10 shown in FIG. 2, the ranges are determined so that the time at which the frame displayed at the center of the first thumbnail array 12 appears in the moving image is included within a range occupied by the frame displayed at the center of the second thumbnail array 14 and its neighboring frames. Accordingly, a scene anterior to or posterior to a scene to which a user pays attention in the first thumbnail array 12 can be checked in the second thumbnail array 14. Hereinbelow, the time code of a frame displayed at the center of a thumbnail array for which a shorter time interval is specified, e.g. first thumbnail array 12, is referred to as the "reference time," which is considered as the time of a scene to which a user pays attention.

Furthermore, a user can shift the first thumbnail array 12 or second thumbnail array 14 leftward or rightward using the input apparatus 108, so that the range of each of the arrays displayed on the thumbnail display screen 10 can be adjusted forward or backward. For example, when the first thumbnail array 12 is to be shifted, the array may be set to move forward by one frame when a user once presses the right button of the directional buttons provided on the input apparatus 108. In this case, since the array itself is shifted leftward, the array is consequently displayed in a manner such that the leftmost thumbnail therein is extruded, and a frame, 15 seconds from the rightmost frame, is newly added thereto. This makes the user feel as if a scene displayed on the first thumbnail array has moved forward by 15 seconds.

As stated above, the two arrays on the thumbnail display screen 10 are displayed so as to include a time in common. Accordingly, it is arranged that, when a user shifts one thumbnail array, the other thumbnail array moves in conjunction therewith. For example, if the aforementioned shift of the first thumbnail array 12 using the right button is repeated eight times, the reference time will be moved forward by two minutes. Since the second thumbnail array 14 displays frames extracted at intervals of two minutes, by shifting second thumbnail array 14 by one frame at the time, the reference time will be positioned nearly at the center of the second thumbnail array 14 as stated previously. The second thumbnail array 14 may be continuously shifted little by little in conjunction with the movement of the first thumbnail array 12, or may be shifted intermittently at the time when the first thumbnail array is shifted by the time interval specified for the second thumbnail array 14.

On the other hand, the second thumbnail array 14 may be defined as the array to be shifted by a user. In this case, it is set that, when the second thumbnail array is shifted by one frame, the first thumbnail array 12 shifts by eight frames automatically. The array to be shifted by a user may be switched between the first thumbnail array 12 and second thumbnail array 14. Hereinafter, a thumbnail array that can be directly shifted according to a shift instruction from a user will be called a "main array," while a thumbnail array that shifts in conjunction with a shift of the main array will be called a "sub-array."

With the configurations above, a user can check slight movement in a scene and also comprehend where the movement appears in the main stream of the moving image. For instance, in a moving image in which similar scenes appear repetitively, it is difficult to understand where a frame belongs in the whole moving image, only with the display of a short scene. In such case, by also concurrently displaying a thumbnail array that displays a longer scene including the neighboring scenes of the short scene, the desired frame can be identified easily and precisely at a glance.

With regard to the frame present across the left or right edge of the thumbnail display screen 10, only part of the frame that fits within the area of the screen 10 may be displayed, as shown in the first thumbnail array 12 of FIG. 2. This makes the user feel as if the user were sequentially viewing a moving image film constituting the whole moving image, so that the user can easily associate the time axis of the moving image with the time axis on the screen.

Also, on the thumbnail display screen 10 of FIG. 2, the frames of the first thumbnail array 12 representing detailed transitions are displayed with a larger size than the frames of the second thumbnail array 14 representing rough transitions. Accordingly, slight movement can be checked in more detail on the first thumbnail array 12, while a longer range of frames can be displayed by the second thumbnail array 14.

The thumbnail display screen 10 may also display a timeline bar 16 and scene time 17, which indicate which part of the whole moving image is displayed at the time. Accordingly, a user can roughly comprehend which part of the moving image is displayed at the time in terms of time so as to access a desired scene efficiently in a relatively long moving image, etc.

Although the thumbnail display screen 10 of FIG. 2 simultaneously displays two thumbnail arrays as an example, the present embodiment is not limited thereto, and hence, the screen 10 may display three or more thumbnail arrays. Also, the size of thumbnail images in each array is not limited to that shown in FIG. 2, and all the images may be displayed with the same size, for example. Further, the screen may be configured to display multiple thumbnail arrays as if they were aligned in the depth direction, and an array selected through the input apparatus 108 may be displayed in such a manner as to move to the front so that a user can check a desired thumbnail array. Such an embodiment is effective in the case, for example, where five or more thumbnail arrays are displayed, as it prevents the screen from becoming complicated.

Figure 3:
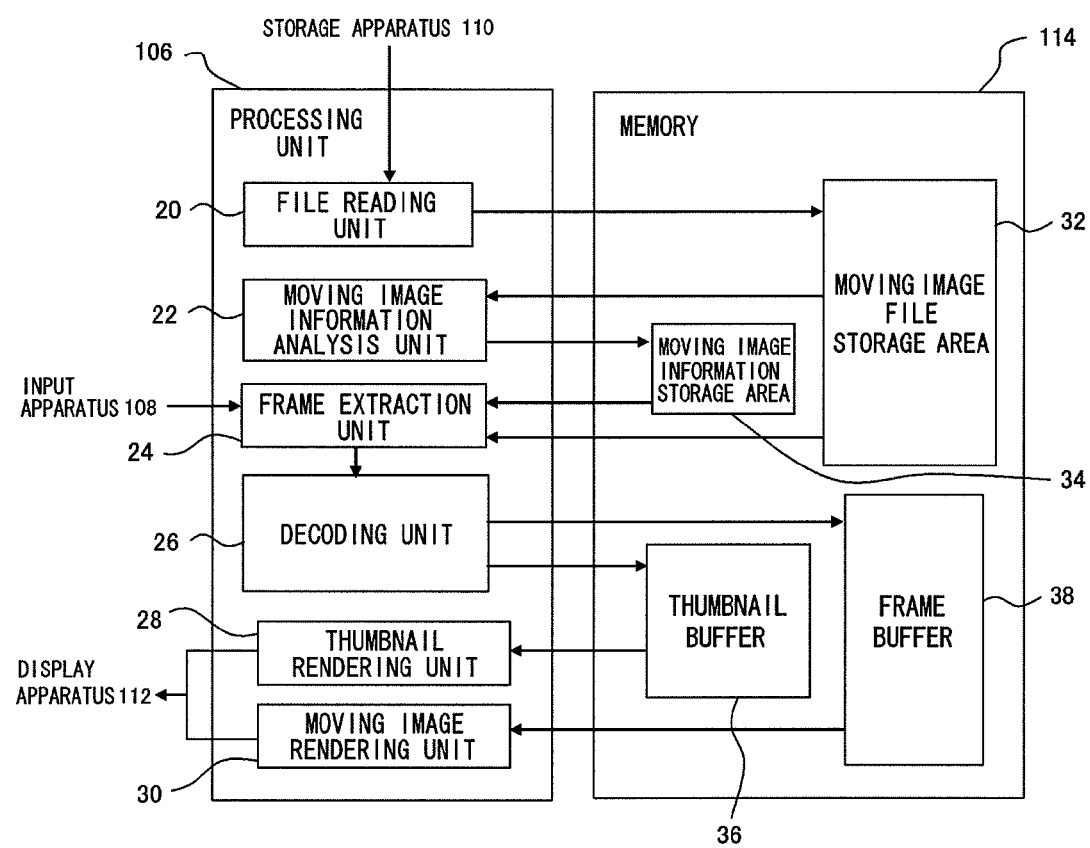
FIG. 3 is a diagram that shows detailed configurations of a processing unit and a memory in the present embodiment.

FIG. 3 shows detailed configurations of the processing unit 106 and memory 114. The processing unit 106 comprises: a file reading unit 20 which reads a moving image file from the storage apparatus 110; a moving image information analysis unit 22 which analyzes a read moving image file to acquire various pieces of moving image information; a frame extraction unit 24 which extracts or successively reads frame data to be displayed from a moving image file; a decoding unit 26 which decodes extracted or read frame data; and a thumbnail rendering unit 28 and a moving image rendering unit 30 which output a decoded frame as an image to the display apparatus 112, in the thumbnail display mode and the normal play mode, respectively.

Each of the elements represented by functional blocks for performing various processes shown in FIG. 3 can be implemented by a CPU, a memory, an LSI or the like in terms of hardware, and by a memory-loaded program or the like in terms of software. Accordingly, it will be obvious to those skilled in the art that these functional blocks may be implemented in a variety of forms by hardware only, software only, or a combination thereof, and the form is not limited to any of them.

The memory 114 comprises: a moving image file storage area 32 which stores a moving image file read by the file reading unit 20; a moving image information storage area 34 which stores various pieces of moving image information acquired by the moving image information analysis unit 22; and a thumbnail buffer 36 and a frame buffer 38 which store image data generated by the decoding unit 26, in the thumbnail display mode and the normal play mode, respectively.

The file reading unit 20 reads from the storage apparatus 110 a moving image file selected by a user from among moving image files stored in the storage apparatus 110, and stores the file in the moving image file storage area 32. The moving image information analysis unit 22 analyzes a moving image file stored in the moving image file storage area 32 to acquire moving image information necessary for subsequent processing. As moving image information, the moving image information analysis unit 22 acquires a video container or the position of a chapter recorded, for example. Alternatively, the position where image structure changes significantly may be detected through image analysis and may be acquired as a scene switching point.

A video container can be used when the frame extraction unit 24 extracts frame data or the decoding unit 26 decodes frame data. A chapter switching point or a scene switching point can be used when the frame extraction unit 24 extracts a frame in the case where a thumbnail at each such point is displayed. A scene switching point can be further used when a moving image is played from the vicinity of a thumbnail selected in the thumbnail display mode, so as to provide a function to start the playing from the nearest scene switching point from the selected thumbnail.

The frame extraction unit 24 extracts frame data to be displayed from a moving image file in the thumbnail display mode. In such occasion, a frame to be extracted is determined based on the time interval preset for each thumbnail array and the number of thumbnail images to be displayed, which depends on the size of thumbnail images to be displayed and the width of the thumbnail display screen 10. According to a shift instruction provided by a user via the input apparatus 108, the frame extraction unit 24 updates the frames to be displayed and extracts the data of a frame to be displayed newly specified. When it is set that the top frame of each chapter or each scene is displayed as a thumbnail, the frame extraction unit 24 acquires information on a chapter switching point or a scene switching point from the moving image information storage area 34 and extracts frame data for each chapter or each scene. When extracting frame data, the frame extraction unit 24 confirms, based on the video container, that the frame is randomly accessible.

Also, when a user provides an input for selecting a thumbnail in the thumbnail display mode, the frame extraction unit 24 switches the mode to the normal play mode and reads all of a series of frame data necessary to play the moving image, specifying a frame determined based on the selected thumbnail as the top frame. For example, the selected thumbnail itself may be specified as the top frame, or a frame at the nearest scene switching point from the selected thumbnail may be specified instead.

The decoding unit 26 decodes frame data extracted or read by the frame extraction unit 24, and stores the decoded image data in the thumbnail buffer 36 in the thumbnail display mode and in the frame buffer 38 in the normal play mode. The decoding unit 26 acquires information necessary for decoding, including encoding method, from the moving image information storage area 34 via the frame extraction unit 24. For decoding, a common method conventionally used may be applied.

The thumbnail rendering unit 28 reads the image data of a thumbnail from the thumbnail buffer 36 in the thumbnail display mode and performs conversion thereon according to the display method of the display apparatus 112, so as to output the data to the display apparatus 112 at an appropriate time. Similarly, the moving image rendering unit 30 reads the data of a moving image to be played from the frame buffer 38 and outputs the data to the display apparatus 112. Processing for outputting may be the same as that generally performed by a graphic processor or the like.

Figure 4:
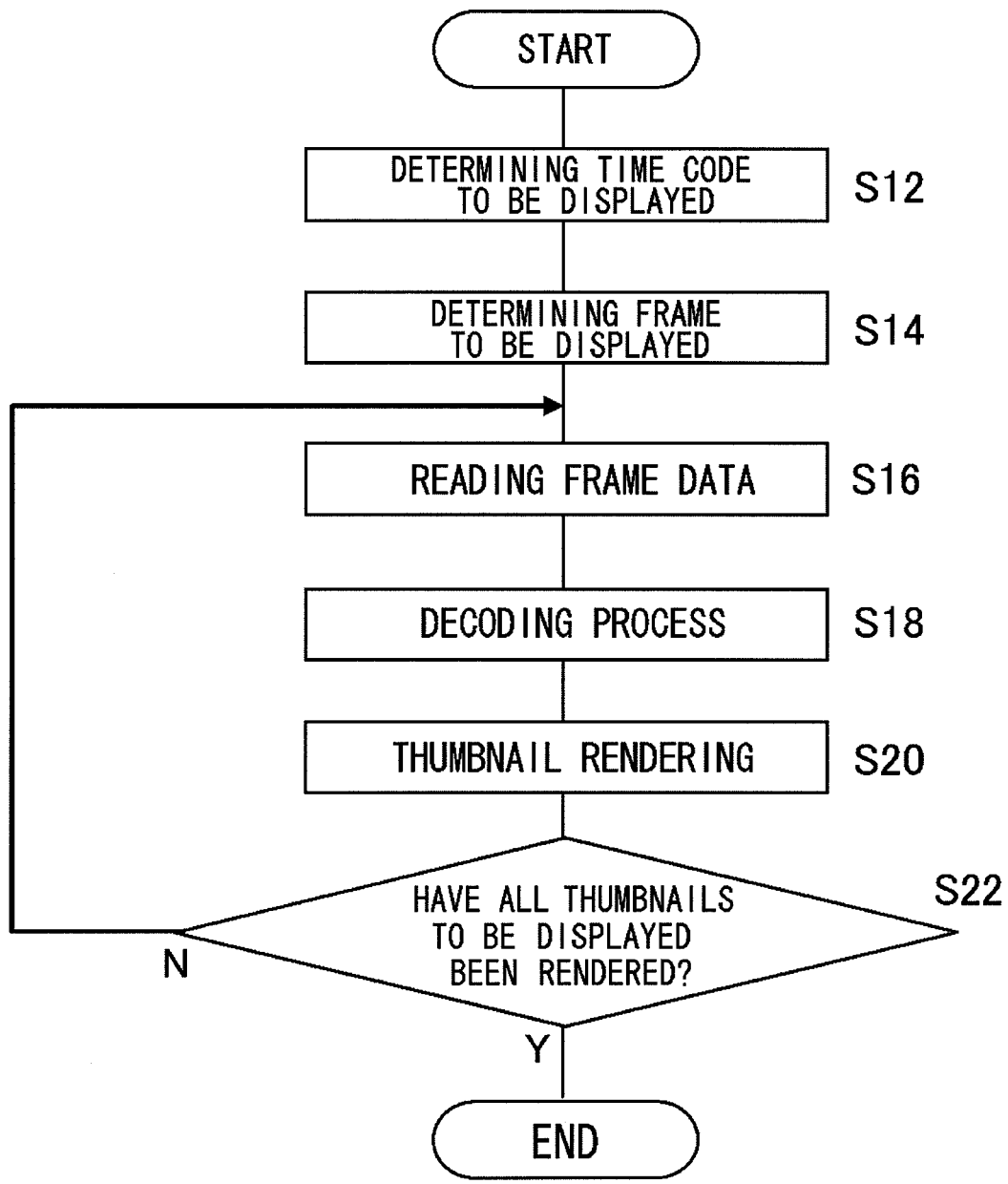
FIG. 4 is a flowchart that shows the procedure for displaying or updating a row of a thumbnail array in the thumbnail display mode in the present embodiment.

In the following, there will be described the operation performed in the thumbnail display mode or at the time of switching to the normal play mode, using the information processor 100 having the configurations shown in FIGS. 1 and 3. FIG. 4 is a flowchart that shows the procedure for displaying or updating a row of a thumbnail array in the thumbnail display mode. First, the frame extraction unit 24 determines the time codes of frames to be displayed (S12).

At the time, the time code of each frame to be displayed is computed based on the range to be displayed, predetermined by the time interval specified for the frames to be displayed and the width of the thumbnail display screen 10, and the reference time determined by a user's input, as stated previously. As will be described later, each frame to be actually displayed may be a frame that is randomly accessible and has a time code near the computed time code. In the initial state of the thumbnail display mode, the time code of each frame may be computed so that the top frame of a moving image is displayed at the left edge, for example. Also, immediately after the switching from the normal play mode to the thumbnail display mode, the time code of the frame that was displayed right before the switching may be set as the reference time, and the time codes of the other frames may be determined accordingly.

After the time codes of frames to be displayed are determined in such way, a frame corresponding to each of the time codes or a randomly-accessible frame near the frame is determined as a frame to be displayed (S14). For example, in a moving image file that has been compressed and encoded using inter-frame prediction, the nearest I-frame from a determined time code is specified as a frame to be displayed. Thereafter, the frame extraction unit 24 reads a piece of frame data to be displayed from the moving image file storage area 32 (S16). The decoding unit 26 then acquires the read frame data and performs a decoding process thereon using a common method (S18). The decoded image data is stored in the thumbnail buffer 36, and the thumbnail rendering unit 28 renders the image as a thumbnail within the thumbnail display area of the display apparatus 112 (S20).

The thumbnails of the frames to be displayed determined in S14 are sequentially rendered within the thumbnail display area (N at S22, S16-S20), and, when the thumbnails of all the frames constituting one thumbnail array are displayed, the process is terminated (Y at S22). The operation set forth above is the basic operation for displaying a thumbnail array.

Figure 5:
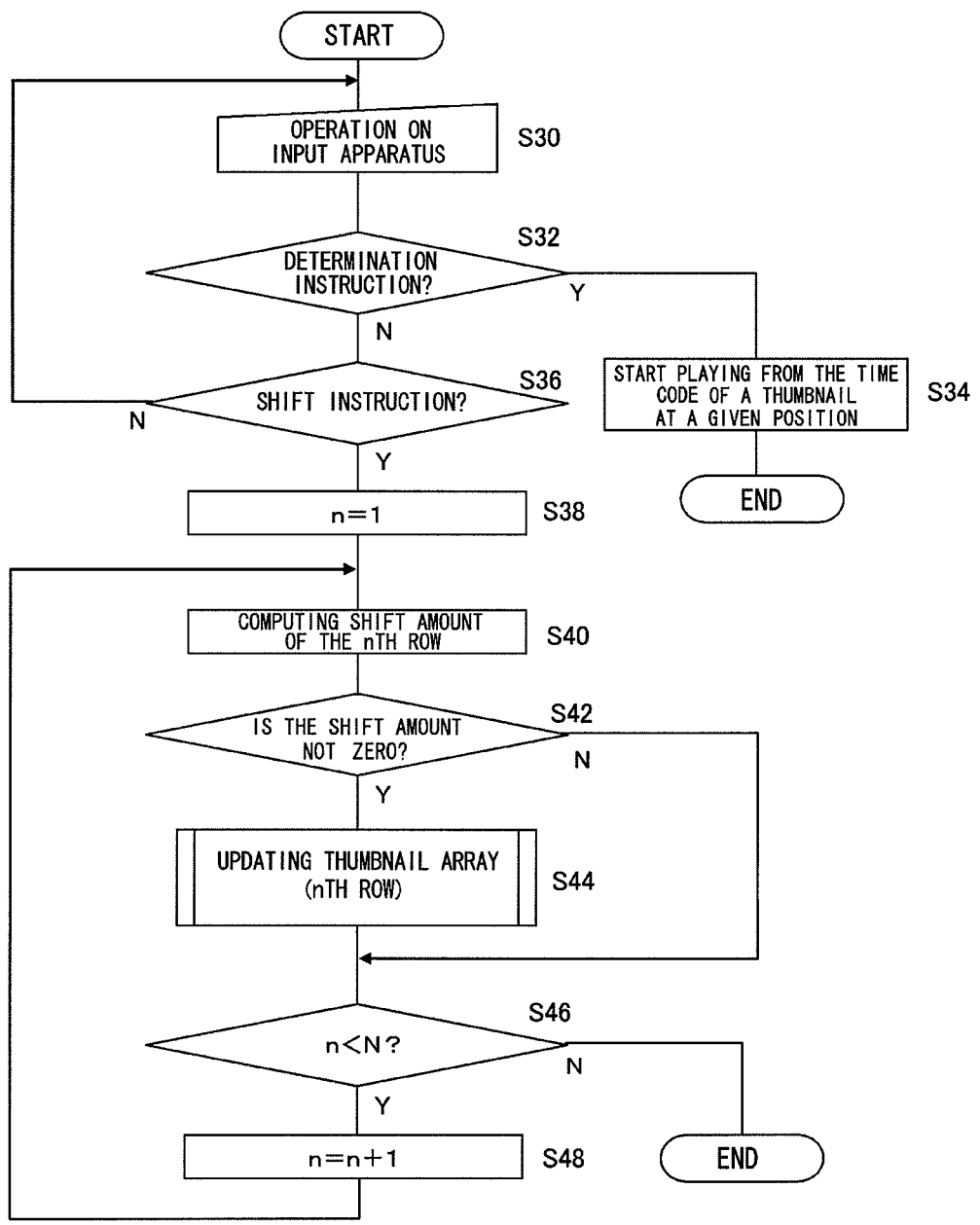
FIG. 5 is a flowchart that shows the procedure for displaying multiple thumbnail arrays in the thumbnail display mode and switching the mode to a normal play mode in the present embodiment.

There will now be described the overall operation including conjunctional movement of a sub-array and the switching to the normal play mode. FIG. 5 is a flowchart that shows the procedure for displaying multiple thumbnail arrays in the thumbnail display mode and switching the mode to the normal play mode. It is assumed here that a moving image file selected by a user is stored in the moving image file storage area 32 of the memory 114, and the moving image information of the file is stored in the moving image information storage area 34. It is also assumed that the mode is set to the thumbnail display mode at this point, and the thumbnail display screen 10 containing N rows of thumbnail arrays is displayed on the display apparatus 112.

If a user provides an operation to the input apparatus 108 in such a situation (S30), and if the operation is an input for instructing determination, such as pressing the "Enter" button, (Y at S32), the mode will change to the normal play mode and the moving image will be played from the reference time, from the frame displayed in a given area of the main array, such as at the center, or from the nearest scene switching point from the frame (S34). It may be set that one of the frames displayed on the thumbnail display screen 10 can be selected by a user, so that a moving image can be played from a selected frame or a frame having a certain relationship with the selected frame, such as a frame at the nearest scene switching point from the selected frame or at the nearest chapter switching point therefrom.

On the other hand, if the operation is an instruction for shifting the main array (N at S32, Y at S36), the shift amount of each of the N rows of thumbnail arrays will be computed sequentially from the first row, and an array of which the shift amount is not zero, i.e., an array required to be shifted, will be updated by displaying the array being shifted (S38-S44). The processing for updating a thumbnail array in S44 is performed according to the procedure shown in FIG. 4.

A relationship between the operation provided to the input apparatus 108 and the shift amount of the main array is preset and stored in the memory 114 or the like. For instance, when the shift operation is performed using the left and right directional buttons, a rule may be set so that the array is shifted by one frame each time either of the buttons is pressed for a short time, and, when the button is pressed continuously for one second or more, the array is shifted by frames of which the number is proportional, with a given proportionality coefficient, to the time over which the button is pressed. The "shift amount" computed in S40 corresponds to the number of frames shifted. The product of the number of frames shifted multiplied by the time interval specified for the frames of the main array is a time variation.

For a sub-array, when the time variation in the main array totaled since the last shift of the sub-array can be accommodated by the time interval specified for the frames of the sub-array, it is determined that the shift amount is zero in S42 (N at S42). On the other hand, when the total time variation in the main array exceeds the time interval specified for the sub-array, it is determined that the shift amount is not zero (Y at S42). In the latter case, the sub-array is shifted so that the reference time is positioned within a range occupied by the frame at the center of the sub-array and its neighboring frames, as stated previously (S44).

The process of S40 through S44 is performed on each thumbnail array (Y at S46, S48), and, when the checks of the shift amount and updating are completed for all of the N rows of thumbnail arrays (N at S46), the process is terminated in such state. Thereafter, the information processor enters into the stand-by state for another input operation from the user, and, when an input operation is provided, the process from S30 is repeated. Also, a button or the like on the input apparatus 108 may be assigned, in advance, to input an instruction for switching from the normal play mode to the thumbnail display mode.

Figure 6:
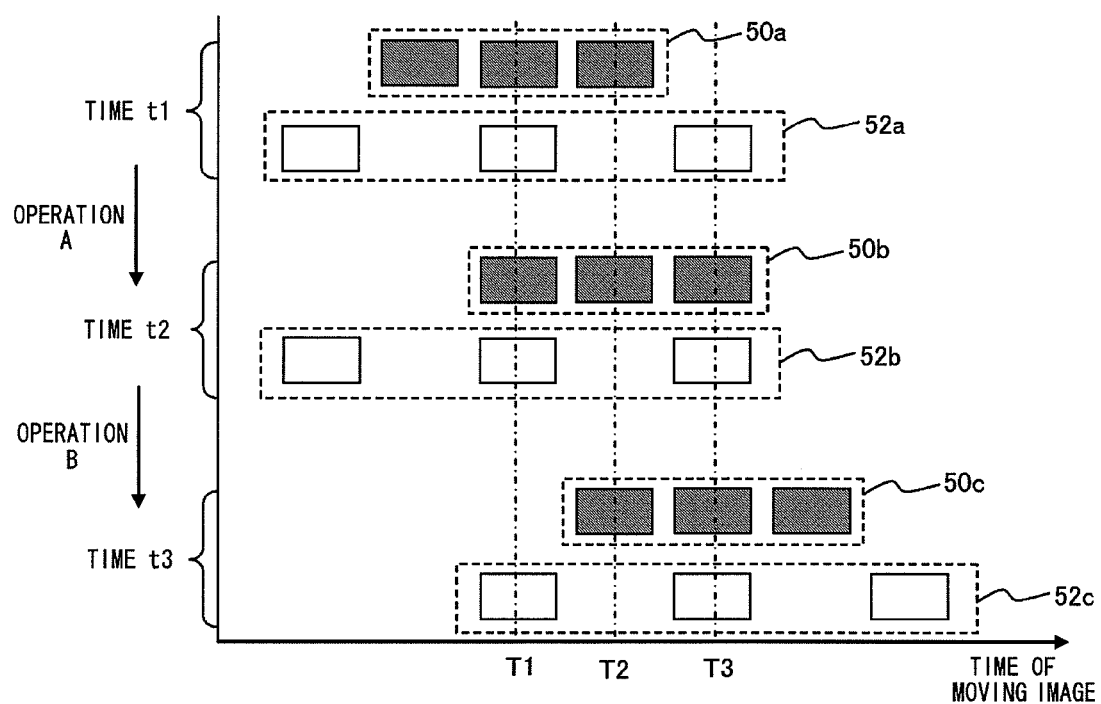
FIG. 6 is a diagram that schematically shows transitions of frames displayed in the thumbnail display mode in the present embodiment.

FIG. 6 schematically shows transitions of frames displayed in the thumbnail display mode. FIG. 6 shows transitions of two rows of thumbnail arrays, and it is assumed here that each of the arrays consists of three frames, for simplicity. Shaded rectangles represent frames constituting a first thumbnail array 50a, while open rectangles represent frames constituting a second thumbnail array 52a. It is also assumed that the time interval specified for the frames of the first thumbnail array 50a is one-half of the time interval specified for the frames of the second thumbnail array 52a. Accordingly, when the horizontal axis represents a common time axis of a moving image, the positions of the frames in the second thumbnail array 52a correspond to the positions of alternate frames in the first thumbnail array. On the actual display screen, however, since two thumbnail arrays are displayed along different time axes, the second thumbnail array 52a is also displayed so that the frames therein are positioned adjacent to each other, as shown in FIG. 2.

Under the conditions set forth above, it is assumed that the first thumbnail array 50a and second thumbnail array 52a display frames as shown in FIG. 6 at time t1 (upper part in the figure). At the time, time T1 is the reference time on the time axis of the moving image. If an operation A is performed in such state so that the first thumbnail array 50a is shifted forward by one thumbnail, the first thumbnail array 50b and second thumbnail array 52b at the time, which is defined as time t2, will display frames as shown in FIG. 6 (middle part in the figure). That is, even if the first thumbnail array 50a at time t1 has shifted by one frame so as to be the first thumbnail array 50b at time t2, the time variation can be accommodated in the second thumbnail array 52a, so that the second thumbnail array 52b at time t2 remains unchanged. The reference time at time t2 is time T2.

If an operation B is performed next so that the first thumbnail array 50b is further shifted forward by one thumbnail, the first thumbnail array 50c and second thumbnail array 52c at the time, which is defined as time t3, will display frames as shown in FIG. 6 (lower part in the figure). That is, since the first thumbnail array 50c at time t3 corresponds to the first thumbnail array 50a at time t1 shifted by two frames, the variation caused there corresponds to just one frame for the second thumbnail array 52a. Accordingly, the second thumbnail array 52c eventually shifts by one frame at time t3. The reference time at time t3 is time T3.

In the example of the thumbnail display screen 10 shown in FIG. 2, since the time interval specified for the first thumbnail array 12 is one-eighth of that specified for the second thumbnail array 14, the second thumbnail array 14 will shift by one frame at the time when the first thumbnail array 12 is shifted by eight frames.

In the examples shown in FIG. 6 and FIG. 2, the frequency of updating the second thumbnail array is less than that of updating the first thumbnail array. Accordingly, when a user provides an input for shifting a thumbnail array at high speed to, for example, check a frame far distant from the frame currently displayed, there may be a case where the extraction, decoding, and rendering of frame data of the first thumbnail array, which is frequently updated, cannot keep up with the input speed. In such case, since the frames constituting the first thumbnail array cannot be displayed, the display area has to be made blank. Alternatively, a certain mark may be displayed to indicate that the relevant data is being decoded.

On the other hand, the second thumbnail array has frames for which a longer time interval is specified, and the array is updated less frequently. Accordingly, even when such shifting as stated above is performed, the extraction, decoding, and rendering processes are more likely to keep up with the input speed, thereby decreasing the possibility of causing a case where frames cannot be displayed. Consequently, a user can stop the shifting of thumbnails at a desired scene without losing the position of the thumbnail shifted forward, and, when the first thumbnail array is displayed, the user can check the screen structure in detail or select one frame in the array.

According to the present embodiment set forth above, frames are extracted according to a given rule, from among frames that constitute a moving image, and the extracted frames are aligned in chronological order to be displayed as a thumbnail array. The thumbnail array can be moved forward or backward according to a shift instruction input by a user. Accordingly, moving image data having a temporal width can be checked for a short time without playing the whole image.

Also, frames extracted at multiple time intervals in a moving image are displayed as multiple thumbnail arrays. In such case, frames to be displayed are determined so that the same scene is included in the multiple thumbnail arrays. In other words, the same scene is displayed along different time axes. Accordingly, the detailed transitions and outline of a moving image can be comprehended simultaneously at a glance. Therefore, a frame can be selected efficiently by comprehensively evaluating the information included in each of the thumbnail arrays. Also, it is set that a moving image is played normally from a selected frame, so that a scene can be selected efficiently and precisely.

When a user inputs an instruction to shift thumbnail arrays at high speed, even if part of the thumbnail arrays cannot display frames in such a manner as to keep up with the shift instruction input, there remains a possibility that another thumbnail array keeps up therewith. This is because the update rates of the thumbnail arrays are different from each other. Consequently, operational errors can be reduced, including a case where shift inputs are continued while thumbnail images remain undisplayed, so that a desired scene is missed or is not reached yet. Also, the inefficient situation where a user suspends the operation until thumbnails are displayed can be avoided. In addition, since multiple thumbnail arrays can be shifted only by providing shift operation, a user feels the operation to be easy and can find out a desired scene intuitively.

The present invention has been described with reference to the embodiment. The embodiment set forth above is intended to be illustrative only, and it will be obvious to those skilled in the art that various modifications to constituting elements or processes could be developed and that such modifications also fall within the scope of the present invention.

For instance, in the present embodiment, frames constituting one moving image are to be processed, and frames extracted at different time intervals are displayed as multiple thumbnail arrays. However, multiple thumbnail arrays may be provided so as to correspond to multiple moving images. For example, the first thumbnail array may be assigned to a moving image A, and the second thumbnail array may be assigned to a moving image B in FIG. 2, so that the frames constituting the respective moving images are displayed as each of the thumbnail arrays. The time interval specified for the frames of each of the thumbnail arrays may the same or may be different. For example, when the same number of frames extracted evenly from the entirety of each moving image are required to be displayed within the same width, the time obtained by evenly dividing the whole playing time of the moving image is specified as the time interval therefor. If thumbnail arrays corresponding to the respective moving images are simultaneously displayed as a matrix on the menu screen on which a moving image to be played is selected, a user can directly select not only a moving image but also a desired scene therein, so that the moving image can be played from the desired scene.

Also, the present embodiment is described using thumbnails of still images basically, but part of or all thumbnails may be moving images. For example, a thumbnail positioned at the center of the main array may be provided as a moving image, and, when the moving image is played until the point of the next thumbnail, the thumbnail array may be automatically shifted by one thumbnail. This embodiment can be easily implemented by combining a conventional technique regarding moving image thumbnails with the procedure for displaying thumbnails described in the present embodiment. With moving images thumbnails, a user can check a scene in more detail without playing the actual moving image. In addition, if the audio of a moving image thumbnail being played is output at the same time, the information amount is increased, so that the accuracy of scene selection will be improved.

Although only the images of frames are displayed as a thumbnail array in the thumbnail display mode of the present embodiment, information based on which a user selects a desired scene may be further added and displayed. For example, the change in the audio level indicated on a time axis may be related to the time axis of each thumbnail array and displayed along the thumbnail array. Also, the size of the image of a frame included in a thumbnail array may be changed according to the audio level. Accordingly, a user can select a scene more accurately, based on the stream of images provided by multiple thumbnail arrays, and information including a high point determined by the audio level and a scene switching point. Besides audio, any information added to a moving image file, such as textual information, may be similarly used.

What is claimed is:

1. An information processor comprising:
a central processing unit for controlling a frame extraction unit which extracts a plurality of frame sequences, each of the frame sequences being extracted from an identical moving image at different time intervals on a time axis of the moving image;
a decoding unit which decodes data of the plurality of frame sequences extracted by the frame extraction unit;
a display unit having a display screen which simultaneously displays a plurality of thumbnail arrays of decoded images, and
an input unit which accepts a user's instruction for selecting a thumbnail array, from among a plurality of thumbnail arrays simultaneously displayed by the display unit, as a target to be shifted, forward or backward,
wherein each thumbnail array corresponds to a particular one of the plurality of frame sequences, and each thumbnail in a thumbnail array represents one of the frame sequences in the corresponding particular one of the plurality of frame sequences,
wherein the plurality of thumbnail arrays are displayed in the order of appearance in the moving image so that all of the displayed plurality of the thumbnail arrays include a thumbnail from each thumbnail array that represents a frame sequence that includes the same time on the time axis of the moving image,
wherein the frame extraction unit identifies, in accordance with the user's instruction, a frame to be displayed in the selected thumbnail array after the shifting and further extracts frame data to be newly displayed; and
wherein the display unit updates the selected thumbnail array with a frame identified by the frame extraction unit.

2. The information processor of claim 1, wherein a range of a moving image provided by each thumbnail array simultaneously displayed by the display unit has a length different from each other.

3. The information processor of claim 1, wherein a range of a moving image provided by each of a plurality of thumbnail arrays simultaneously displayed by the display unit includes a scene in common.

4. The information processor of claim 1, wherein:
the frame extraction unit determines, based on a variation of a range of a moving image provided by the one thumbnail array shifted caused by the user's instruction, a shift amount of another thumbnail array so as to reflect the variation in the another thumbnail array, and the frame extraction unit identifies a frame from the another thumbnail array to be displayed after the shifting and further extracts frame data to be newly displayed with respect to the another thumbnail array; and
the display unit updates the another thumbnail array with a frame identified by the frame extraction unit,
wherein the frame identified from the another thumbnail array and the frame identified from the one thumbnail array represent a common time interval from the moving image and are displayed aligned on a common time axis.

5. The information processor of claim 1, wherein the input unit further accepts a user's instruction for selecting one frame from among frames included in one of the thumbnail arrays simultaneously displayed by the display unit, wherein:
the decoding unit sequentially decodes a selected frame accepted by the input unit or a frame having a predetermined relationship with the selected frame, and the subsequent frames; and
the display unit sequentially displays frames decoded by the decoding unit so as to display one moving image.

6. The information processor of claim 5, wherein:
the decoding unit is configured to acquire an information on a scene switching point recorded in the moving file, and decode frames from that at a scene switching point nearest from the selected frame.

7. The information processor of claim 1, wherein:
the display unit displays the image of frames with a larger size in the thumbnail array corresponding to a shorter time interval.

8. The information processor of claim 1, wherein:
the display unit is configured to display the plurality of thumbnail arrays as if they were aligned in a depth direction, and display an array selected by a user to appear to move to a lesser depth than previously displayed.

9. The information processor of claim 1, wherein:
the display unit plays a moving image as one of the thumbnails in the selected thumbnail array, and, when the moving image is played until the point of the next thumbnail in the selected thumbnail array, the display unit shifts the selected thumbnail array by one thumbnail.

10. An information processing method, comprising:
extracting at plurality of frame sequences, each of the frame sequences being extracted from an identical moving image at different time intervals on a time axis of the moving image;
decoding extracted data of the plurality of frame sequences to generate image data and storing the image data in a buffer;
reading image data stored in the buffer and simultaneously displaying on a display a plurality of thumbnail arrays of decoded images;
accepting a user's instruction for selecting a thumbnail array, from among a plurality of thumbnail arrays simultaneously displayed, as a target to be shifted, forward or backward;

identifying, in accordance with the user's instruction, a frame to be displayed in the selected thumbnail array after the shifting and further extracting frame data to be newly displayed; and updating the selected thumbnail array with the identified frame, wherein each thumbnail array corresponds to a particular one of the plurality of frame sequences, and each thumbnail in a thumbnail array represents one of the frame sequences in the corresponding particular one of the plurality of frame sequences, and wherein the plurality of thumbnail arrays are displayed in the order of appearance in the moving image so that all of the displayed plurality of the thumbnail arrays include a thumbnail from each thumbnail array that represents a frame sequence that includes the same time on the time axis of the moving image.

11. The information processing method of claim 10, further comprising:

determining a shift amount of each thumbnail array other than the selected thumbnail array in accordance with the user's instruction; and updating the display of each thumbnail array in accordance with a determined shift amount so that a range of a moving image provided by each of the thumbnail arrays varies by the same variation.

12. The information processing method of claim 10, further comprising:

accepting an input for selecting one frame from among frames included in the thumbnail arrays;

sequentially decoding a selected frame or a frame having a predetermined relationship with the selected frame, and the subsequent frames; and sequentially displaying decoded frames so as to display one moving image.

13. A non-transitory computer readable medium encoded with a computer program that when executed on a processor causes the computer to perform a information processing method, comprising:

extracting a plurality of frame sequences, each of the frame sequences being extracted from an identical moving image at different time intervals on a time axis of the moving image;

decoding extracted data of the plurality of frame sequences to generate image data and Storing the image data in a buffer;

reading image data stored in the buffer and simultaneously displaying on a display a plurality of thumbnail arrays of decoded images;

accepting a user's instruction for selecting a thumbnail array, from among a plurality of thumbnail arrays simultaneously displayed, as a target to be shifted, forward or backward;

identifying, in accordance with the user's instruction, a frame to be displayed in the selected thumbnail array after the shifting and further extracting frame data to be newly displayed; and updating the selected thumbnail array with the identified frame, wherein each thumbnail array corresponds to a particular one of the plurality of frame sequences, and each thumbnail in a thumbnail array represents one of the frame sequences in the corresponding particular one of the plurality of frame sequences, and wherein the plurality of thumbnail arrays are displayed in the order of appearance in the moving image so that all of the displayed plurality of the thumbnail arrays include a thumbnail from each thumbnail array that represents a frame sequence that includes the same time on the time axis of the moving image.

* * * * *